Feb. 27, 1945.    H. VOLKS    2,370,595
GRILL AND CHAFING DISH
Original Filed May 14, 1940
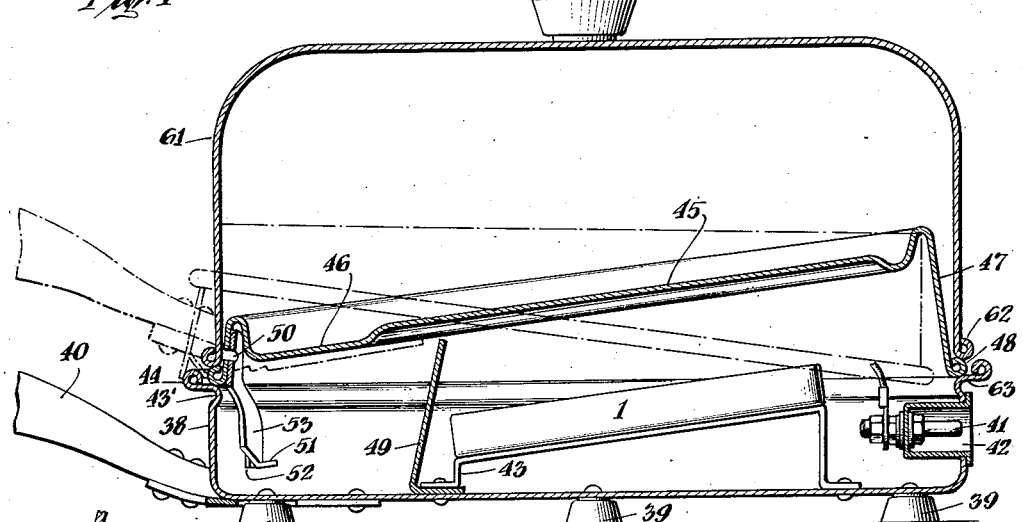
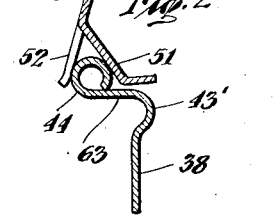
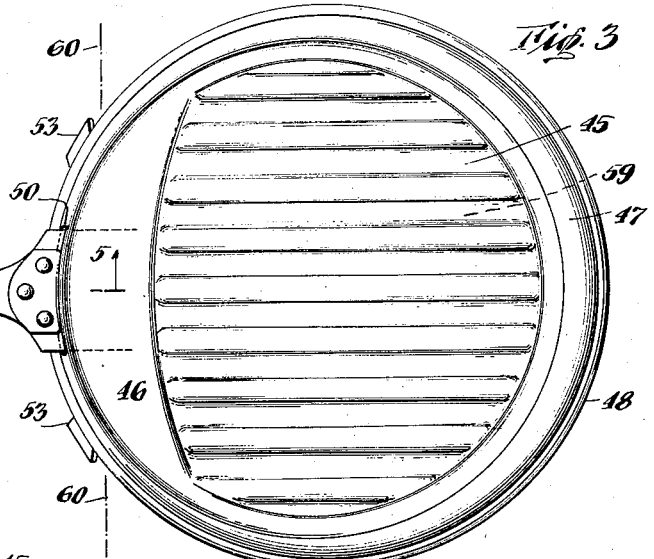
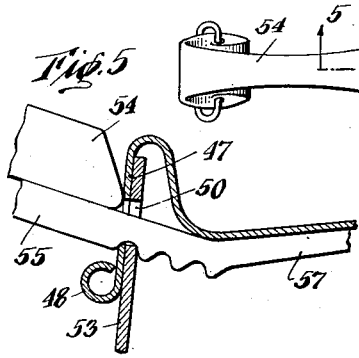
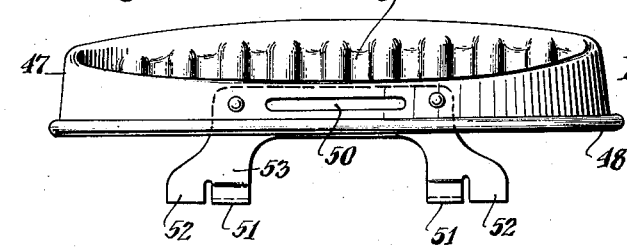
INVENTOR.
Herbert Volks
BY
Edwards, Bower & Fork
ATTORNEYS Patented Feb. 27, 1945

2,370,595

UNITED STATES PATENT OFFICE 2,370,595

GRILL AND CHAFING DISH

Herbert Volks, New York, N. Y., assignor to Sulzer Freres, S. A., Winterthur, Switzerland, a corporation of Switzerland Original application May 14, 1940, Serial No. 335,044. Divided and this application January 1, 1943, Serial No. 471,007

2 Claims. (Cl. 99—425)

My invention relates to improvements in cooking grills adapted to be placed on the table.

An object of my invention is to provide a table grill adapted to cook meat and the like with a minimum to smoke and which may be adapted to fit into a chafing dish provided with heating means adapted either to cook the meat or to keep it warm indefinitely without loss of flavor.

In broiling meat and the like, the heat of the grill is sufficiently high to cause too rapid vaporization of juice and even burning of grease, thus destroying the aroma of the food and creating smoke. This may be avoided or at least minimized by providing the grill with grooves adapted to drain off such juice and grease to a relatively cool place. I have found that once the meat has been cooked it may be kept warm indefinitely without loss of flavor provided it is kept in a warm vapor of its own juices.

In my improved grill and chafing dish I have provided means whereby the grease and juices drain into a relatively cool reservoir while the food is cooking, thus reducing smoke from burning of the grease to a minimum and retaining the juice. When the meat has been cooked the grill is moved to horizontal position, and the juices and grease flow back to a position under the meat. Heating means in the chafing dish warm the juices and grease under the meat slowly vaporizing the juices. The vapor so produced envelops the meat and keeps it warm without further cooking or loss of flavor.

My invention is illustrated in the drawing hereto, in which

Fig. 1 is a cross section of another form of grill and chafing dish embodying my invention;

Fig. 2 is a detailed view of one of the bifurcated front feet of the grill shown in Fig. 1 when in a horizontal position;

Figs. 3 and 4 are respectively a plan view and a front elevation of the grill shown in Fig. 1; and Fig. 5 is a cross section taken along line 12—12 of Fig. 3 and represents a handle in position for moving the grill.

A form of grill embodying my invention is illustrated in Figs. 1 to 5, inclusive. In this embodiment the lower portion of the combined grill and chafing dish consists of a circular pan shaped portion 38 (Fig. 1) mounted on insulated feet 39 and equipped with a handle 40. Electrical terminals 41 set in recesses 42 at the rear of the chafing dish are connected with electric heating unit 1 which is mounted on brackets 43 within the lower portion of the chafing dish. The upper walls of said lower portion terminate in annular beads 43 and 44.

The grill consists of a circular corrugated cooking surface 45 (Fig. 3) adapted to drain into a shallow crescent shaped trough 46 when in operative condition. An annular apron 47 terminating in bead 48 rests upon bead 43, thus supporting the grill in an inclined position while cooking is in progress (Fig. 1). Metal plate 49 deflects heat toward the center of the cooking surface and away from trough 46, which is removed from close proximity to heating unit 1 in order to minimize burning of grease.

When the food has been cooked, a holder is inserted in slot 50 (Fig. 4) in the front portion of the grill. The cooking surface is then raised and slipped forward until prongs 51 and 52 of the bifurcated front feet 53 of the grill rest upon outer bead 44 of the lower portion of the chafing dish (Fig. 2). The grill is thus held horizontally, enabling a portion of the juices to flow back under the food.

A holder suitable for moving the grill is illustrated in Fig. 5. Such holder comprises a handle 54 of wood or the like to which is attached a metal plate 55 having arcuate indentations on the underside thereof adapted to grip the lower edge of slot 50. Plate 55 terminates in a flat portion 57 having tines adapted to fit under the corrugations of the grill surface.

If desired the grill may be used in connection with an ordinary gas stove. When so employed the grill should be placed at the front of the stove so that front legs 53 of the grill hang over the edge 60 of the stove (Fig. 3) while food is being cooked. The grill is thus supported on annular bead 48 in an inclined position, and gas burner 59 is located under the central portion of the corrugated cooking surface. When the cooking is completed the grill is raised to a horizontal position by a handle of the type shown in Fig. 5 and held in that position by front feet 53 of the grill.

Finally, a circular cover 61 is provided as shown in Fig. 1. The edge of this cover consists of a bead 62 and is adapted to rest either upon bead 48 of the grill or on annular platform 63 between beads 43 and 44 of the lower portion of the chafing dish. As so designed the cover may be used either with the grill or with the lower portion of the chafing dish as desired.

My improved grill and chafing dish minimize smoking, preserve aroma and will keep food warm indefinitely without loss of flavor. Moreover the various parts of my improved table grill are adapted to a variety of uses. Thus the grill may be heated by an ordinary type of kitchen stove or by the chafing dish; the cover will fit either chafing dish or grill; the chafing dish can either cook the food or merely keep it warm and will support the grill either horizontally or on an incline, and my holder is adapted both to lift the grill and to serve the food. In addition my chafing dish and grill present an attractive appearance and may be used on the table.

Instead of or together with the corrugated plate one may use a plain pan or a perforated plate for cooking different sorts of food such as potatoes, vegetables, etc.

This application is a division of my copending application Serial No. 335,044, filed May 14, 1940, for Grill and chafing dish, now Patent No. 2,310,157.

I claim:

1. A sheet metal grill pan adapted for use on top of a stove comprising a body portion having a downwardly extending peripheral flange with its lower edge in a substantially horizontal plane in one position of the pan, a continuous cooking portion consisting of alternate parallel ridges and channels with the channels steeply inclined downward from a peripheral portion toward an opposite shallow trough so as to drain liquids off into said trough when the grill is in operative position on the stove and thereby quickly remove juices from said cooking portion, and means providing a pair of supporting feet protruding downward below the lower edge of the downwardly extending flange and adapted to support the cooking portion of the pan substantially horizontally in another position of the pan to enable a portion of the juices to flow back under the food on said cooking portion of the pan.

2. A grill pan as set forth in claim 1 in which the downwardly extending flange and supporting feet means are slotted and provided with a separate detachable holder comprising a handle portion and plate portion extending at an angle thereto, said plate portion passing through said slot and engaging under the cooking portion of the pan to lift it on and off the stove.

HERBERT VOLKS.